United States Patent [19]
Palmieri et al.

[11] 3,835,454
[45] Sept. 10, 1974

[54] PLURAL CHANNEL FM REMOTE CONTROL SYSTEM

[75] Inventors: Joseph Palmieri, Deep River; Douglas M. French, New Haven, both of Conn.

[73] Assignee: Westport International, Inc., Milford, Conn.

[22] Filed: Oct. 10, 1972

[21] Appl. No.: 296,268

[52] U.S. Cl. ............... 340/171 R, 343/225, 325/30
[51] Int. Cl. .......................................... H04b 1/00
[58] Field of Search ...... 340/171 R, 147 PC, 167 R, 340/167 A, 183, 349; 325/30, 64; 343/225

[56] References Cited
UNITED STATES PATENTS

| | | | |
|---|---|---|---|
| 2,928,900 | 3/1960 | Pawley | 340/183 X |
| 2,929,051 | 3/1960 | Pawley | 340/183 X |
| 3,372,393 | 3/1968 | Cataloo | 343/225 |
| 3,614,620 | 10/1971 | David | 325/30 |
| 3,668,560 | 6/1972 | Padalino et al. | 325/142 X |
| 3,764,912 | 9/1972 | Abraham et al. | 325/31 X |

FOREIGN PATENTS OR APPLICATIONS
921,643    3/1963    Great Britain ................ 340/147 PC

*Primary Examiner*—Donald J. Yusko
*Attorney, Agent, or Firm*—Ernest M. Junkins

[57] ABSTRACT

A system for individually adjusting a plurality of remotely located servo units according to the adjustment of a manual control for each unit by transmitting an FM carrier signal that is broken into a plurality of segments with each segment including a portion having a low frequency and another portion of a high frequency with the duration of each segment being related to the setting of its manual control. An FM receiver decodes the wave to produce an electrical pulse related to the duration of each segment with the associated servo unit assuming a position that is related to the pulse duration. The transmitter is capable of selecting any one of a plurality of different carrier frequencies and if each device receives only one of the carrier frequencies, the transmitting may select the device to be controlled.

8 Claims, 5 Drawing Figures

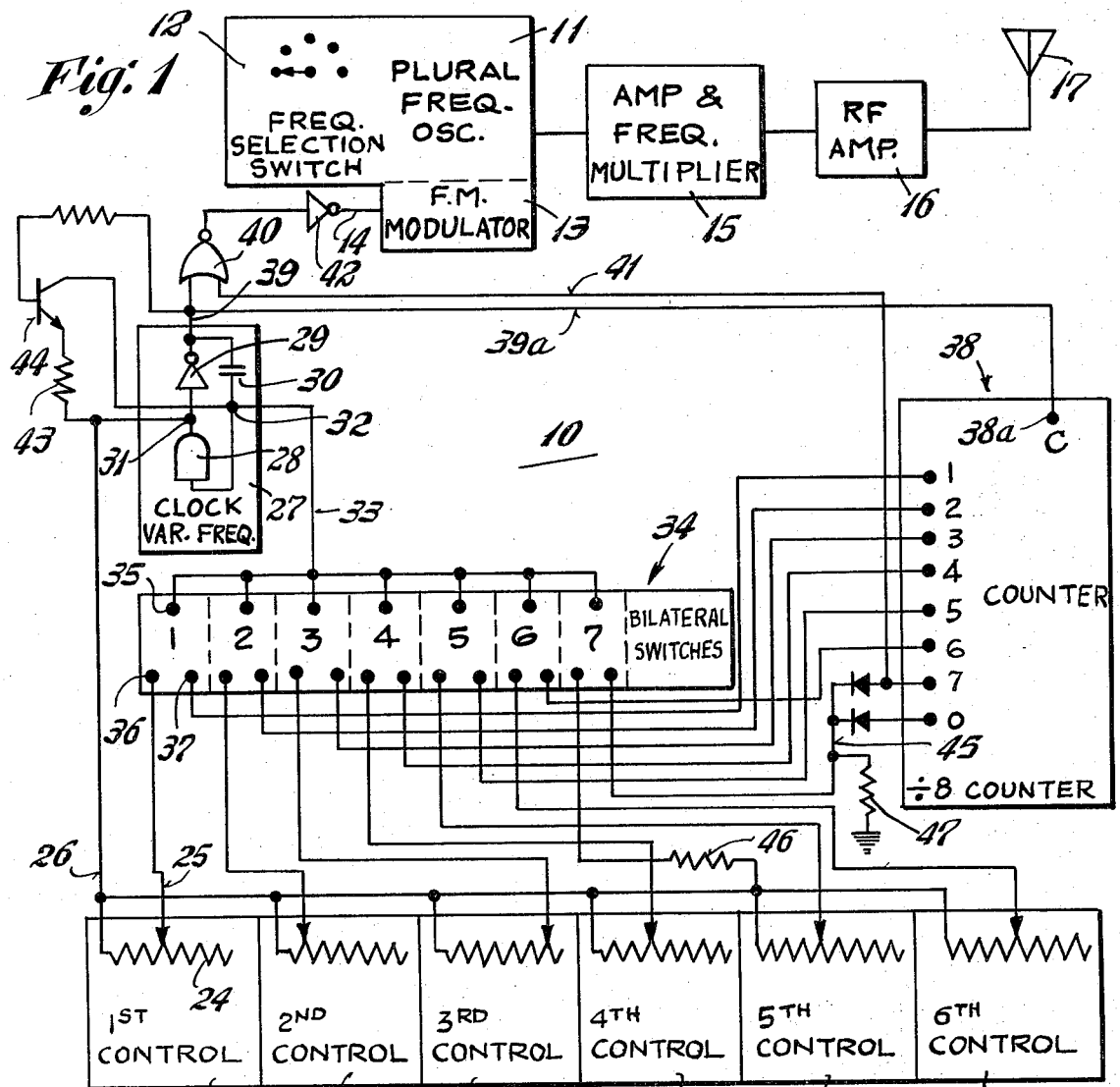
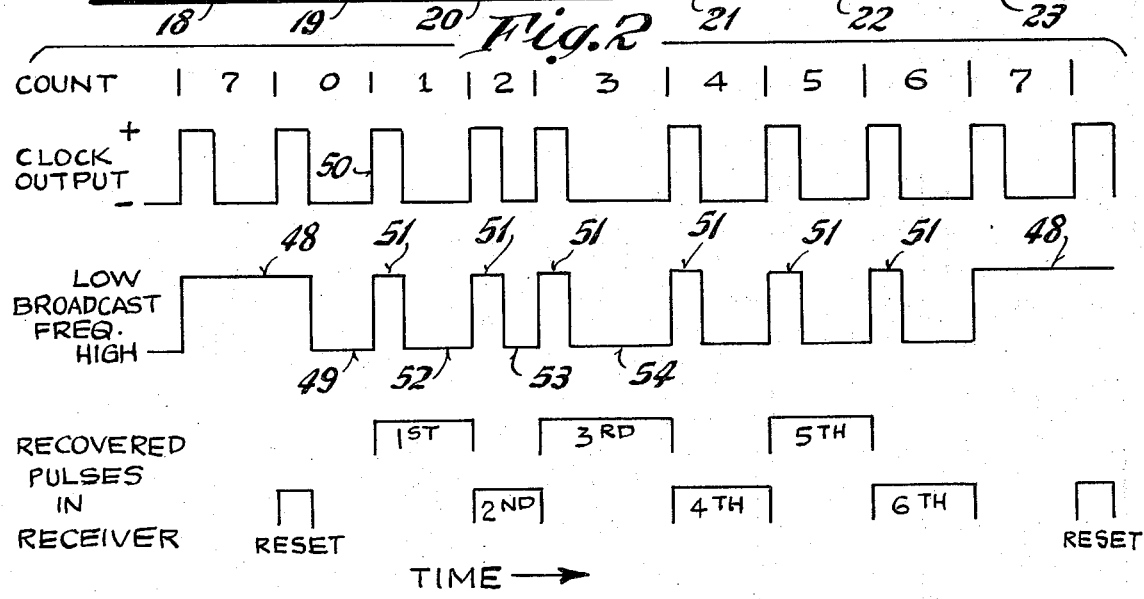

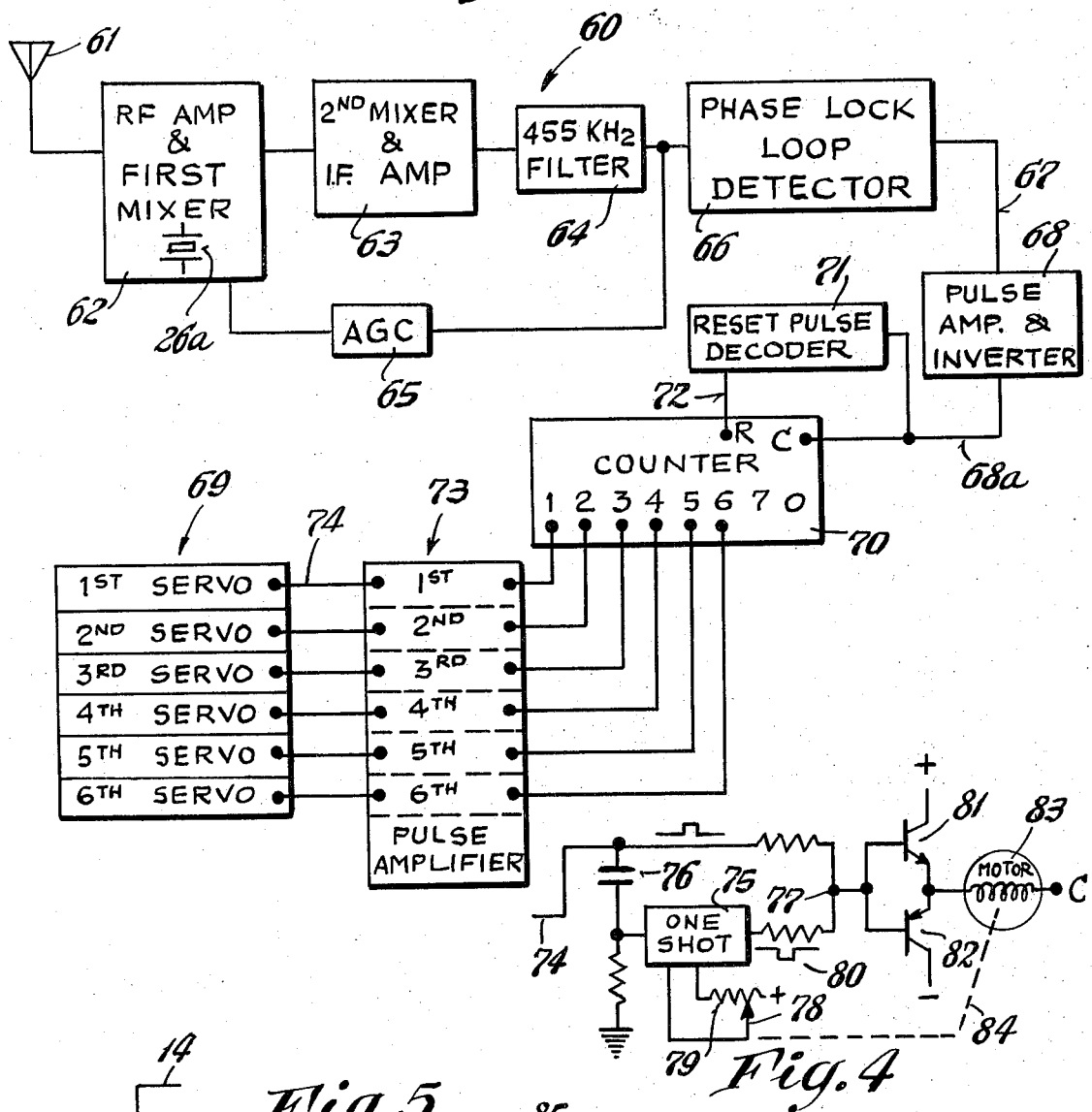

PLURAL CHANNEL FM REMOTE CONTROL SYSTEM

In U.S. Pat. application Ser. No. 224,502 assigned to the assignee of the present invention, there is disclosed a remote control system that may be advantageously used to enable manual control over remotely located devices, such as model airplanes, boats, cars, etc. There are a plurality of servo units in a device with a manual control for each and the system senses the adjustment of each control and transmits a modulated radio wave related thereto. The device receives the wave and decodes it into an electrical signal for each servo unit to control the adjustments thereof. The system modulates the frequency of the wave to transmit the sensed adjustment of the manual controls.

While such a system has been found satisfactory, it utilizes an interrupted wave to transmit the sensed adjustment which may be found undesirable in some instances as there is a tendency of interrupted waves to created noise interference in waves of adjacent frequencies. Further it modulates the wave within the band width of the carrier according to sensed values of voltage which not only prevents its usage with devices having servo units that respond to different signals but also is susceptible to inaccuracy with marked changes in battery voltage in either the transmitter or the device.

It is accordingly an object of the present invention to provide a remote control system for controlling a plurality of servo units on a single carrier frequency which uses an uninterrupted frequency modulated radio wave.

Another object of the present invention is to achieve the above result with a system that though using a frequency modulated wave provides a signal that is varied in duration by the adjustment of the controls with the servo units responding to the duration.

A further object of the present invention is to provide a remote control system that is durable and reliable in use, capable of maintaining precise adjustment between manual control and a servo unit even over a wide range of operating conditions and for the accuracy and results achieved is somewhat economical to manufacture.

Another object of the present invention is to achieve the above objects with a transmitter in a radio control system that is capable of being easily adjusted to operate at any one of a plurality of different carrier frequencies and still accurately control a plurality of servo units for any carrier frequency selected.

In carrying out the present invention of an FM radio control system, there is provided a transmitter that is adjustable to broadcast a radio wave at any one of a plurality of set carrier frequencies within a permitted range which may be, for example, of 26.970 to 27.270 $MH_z$. The frequency for each carrier is set by the government for higher power transmitters while with lower power transmitters no specific carrier frequencies are set, at least within the permitted range, and hence can be selected by the user.

The transmitter is connected to sense and transmit the setting of each of a plurality of individually adjustable controls with the wave carrying the information of each adjustment. This is effected in the present invention by frequency modulating the wave so that it only contains two frequencies, a high and a low frequency. These two frequencies are spaced a few $KH_z$ apart and which in the example of a carrier frequency of 26.995 $MH_z$ could be 26.990 $MH_z$ and 27.000 $MH_z$. The wave transmits the high and low frequencies in a continuously repeatable sequence with each sequence having information of the adjustment of each control. Each sequence includes a plurality of segments, one for each control and each segment consists of a portion at the high frequency and a portion at the low frequency so that with six controls for example, the transmitted wave in a sequence has at least six high frequency portions and six low frequency portions with the portions occurring alternately.

The information of the sensed adjustment of a control is transmitted by the wave by varying the duration of each segment according to the adjustment. As each segment begins by a shift from a high to a low frequency, the duration of each segment thus consists of the time between adjacent changes of low to high frequency and hence may be basically considered as transmitting information by pulse position, namely the duration between the beginning of each segment. The segments occur sequentially in the sequence and the controls are connected so that each control regulates only the duration of one segment of each sequence and it is the segment having the same relative position in each sequence. Thus as a remotely located device having an FM receiver and a plurality of servo units receives the transmitted wave, it initially decodes the wave into a sequence of electrical pulses that have the same duration as the segments. Each pulse is then directed to the servo unit which is to be controlled by the control that regulated the segment from which the pulse was derived. The servo unit responds to achieve a position that is related to the duration of its received pulse with the response being a position that is precisely that dictated by the adjustment of its associated control.

The transmitter with the above-described manner of transmitting information may select the carrier frequency on which it transmits from any one of a plurality thereof, by a simple switch adjustment. The switch is connected to a plural frequency oscillator, which is set to provide the desired different carrier frequencies. As each remotely located device is tuned to receive on only one of a number of carrier frequencies by being able to shift the carrier frequency, the present transmitter may thus be usable to control any one of a plurality of devices.

Other features and advantages will hereinafter appear.

IN THE DRAWINGS

FIG. 1 is a block and schematic diagram of the controls and the transmitter of the present invention.

FIG. 2 is a chart of various conditions with time as a baseline.

FIG. 3 is a block and schematic diagram of a receiver and servo units that is positioned in a remotely located device.

FIG. 4 is an electrical schematic diagram of a servo unit.

FIG. 5 is an electrical schematic diagram of a plural carrier frequency oscillator which may be used in the transmitter of the present invention.

Referring to the drawing, the transmitter of the present system is generally indicated by reference numeral 10 and includes a plural carrier frequency oscillator 11 together with a carrier frequency selection switch 12.

An FM modulator 13 is connected to the oscillator to alter the frequency of the carrier frequency in accordance with a voltage level on a lead 14. The modulated output from the oscillator is amplified and its frequency multiplied by a block 15 with the subsequent signal being amplified by RF amplifier 16 and then directed to an antenna 17 where it is broadcast. The specific structure of the oscillator and FM moulator is more fully disclosed in FIG. 5 while the multiplier in block 15 and RF amplifier 16 may be of any conventional design utilized in FM transmitters which are capable of transmitting power on the order of 100 milliwatts.

The voltage on the input lead 14 to the modulator controls the broadcast frequency and when there is no signal on the lead 17, i.e., it is grounded, the oscillator functions at a slightly higher frequency than that which produces the carrier frequency while with a positive voltage on the lead 14 the modulator 13 decreases the oscillator frequency. Thus, by shifting the voltage on the lead 14 the broadcast wave may have its frequency shifted between a low and a high frequency. Preferably, the two frequencies are centered about the carrier frequency so that the increase and decrease of frequency therefrom is identical in order to maintain the two frequencies close to the carrier frequency for ease of receiving. Also it is of a somewhat wide range but less than the spread allotted to the selected carrier frequency so as to prevent overlapping of carrier frequency bands. One example being if the band width is $\pm 25 KH_z$ from the carrier frequency, so that the carrier frequencies differ by 50 $KH_z$ the change by either a ground or plus signal on the lead 14 would be $\pm 5 KH_z$ from the carrier frequency at the antenna 17 so that while there is a relatively wide change in the frequency it is not sufficient to effect trespass beyond the allotted band of the carrier frequency.

The broadcast wave is used to transmit information of the setting or adjustment of a plurality of controls 18–23 inclusive which are indicated as 1st, 2nd, 3rd, 4th, 5th and 6th controls, respectively. Each of the controls is identical and referring to the 1st control 18, it consists simply of a resistance 24 and a tap 25. The position of the tap on the resistance 24 with respect to a lead 26 common to all resistors in the controls sets the value of resistance between the lead 26 and the tap and thus is indicative of the control adjustment.

The value of the resistance of each control is utilized to alter the frequency of a variable frequency clock 27 shown diagrammatically as including a gate 28 and an inverting amplifier 29 with a capacitor 30 being connected from the output of the amplifier 29 to the input of the gate 28. It will be understood that by varying the resistance connected between a point 31 connected to the output of the gate 28 and a point 32 connected to the capacitor 30 that the frequency of the clock may be varied therewith as the resistance and capacitor constitute an RC network having a time constant depending on their values.

The point 31 is connected to the lead 26 while the point 32 is connected to a lead 33 that is common to all the outputs of a plurality of bilateral switches generally indicated by the numeral 34. Each switch, referring specifically to the switch designated 1, has an output 35, an input 36 connected to a tap of a control and a gate 37 connected to a specific count of a divide by 8 counter 38. Whenever a positive voltage is applied to the gate 37 of a bilateral switch 1 a short circuit is effectively made between the input 36 and the output 35 so that the portion of the resistance 24 between the lead 26 and the tap 25 is connected between the points 31 and 32. In the absence of a positive voltage on the gate, a bilateral switch is effectively open-circuited between the input and output.

For controlling the selection of conduction of the bilateral switches, the counter 38 has eight count terminals designated 1 through 0 with the count terminals designated 1 through 6 being connected respectively to the control terminals of the bilateral switches also designated 1 through 6. Thus, whenever the counter has a count of 1 only the count terminal 1 has a positive voltage and hence only the bilateral switch 1 is capable of conducting; when the count of the counter 38 is 2 only the bilateral switch 2 is capable of conducting, etc. Thus, the counter 38 sets which bilateral switch 1 through 6 is rendered conducting to insert that portion of the resistance determined by its associated control between the points 31 and 32 to control the frequency of the clock with the switches being sequentially conducting as the counter advances its count.

The output from clock 27 is on a lead 39 which constitutes one input to an OR gate 40 with another input to the OR gate 40 being on a lead 41 connected to the count 7 terminal of the counter 38. The output of the gate 40 constitutes the input to an amplifying inverter 42 which in turn has its output connected to the lead 14 to control the voltage to the modulator 13.

The output of the clock irrespective of its frequency consists of a cycle having a portion that is positive and a portion that is negative or ground. For the portion of each clock cycle when the output is positive it is passed through the gate 40 to the inverter 42 and appears as a positive voltage to the modulator 13 to cause it to have the low frequency for the duration of this voltage. For the remaining portion or other half cycle of the clock output the lead 39 is low, the inverter 42 applies a low or ground voltage to the modulator 13 to make the broadcast frequency high for the duration of this signal. Thus, the modulator 13 will have applied to it either a ground or a high voltage with a change from one to the other being essentially instantaneous and which effectively provides an instantaneous broadcast wave change from high to low or low to high frequency with the change occurring basically simultaneously with the change of the output of the clock 27.

The output wave is continuously transmitted at either a high or low frequency which alternates and with a portion of low frequency and its adjacent high frequency portion constituting a segment. For correlating the clock control over the frequency with the control of the controls over their respective segments, the counter has applied to its count terminal 38a the output from the clock 27 on the lead 39a so that each time the clock output shifts from a low to a high positive output, the counter indexes one count. After 6 counts, during which time the count of the counter is shifted from 1 through 6 and simultaneous therewith the bilateral switches 1 through 6 have been rendered conductive sequentially to apply the settings of the controls 1 through 6 to the clock 27, the transmitter is caused to broadcast a reset pulse which includes a long duration of low frequency.

This is achieved by the counter 38 when having a count of 7 applying through the lead 41, its high voltage to the OR gate 40 which after passing through the inverter 42 is applied to the modulator 13. This high voltage exists for the entire duration that the counter has a count of 7. When the clock begins the positive half of the next cycle, the counter 38 shifts to a count of 8 and the clock 27 maintains the high voltage at the modulator 13 for the remainder of the positive half cycle to maintain the low broadcast frequency. The negative or low portion of the half cycle causes a ground coltage to be applied which changes the broadcast wave to its high frequency. Thus, during the time that the counter has a count of 7 and for a portion of the count of 8 a continuous or unbroken low frequency wave is broadcast. The next cycle of the clock causes the counter to assume a count of 1 which again repeats the applying sequentially of the control resistances to the clock 27 and then the reset signal. Thus, a repeatable sequence of the broadcast wave is effected with each sequence including six segments each having a high and low frequency portion and a reset signal also having a high and low portion with the wave being continuous and only shifting between these two frequencies.

While each of the controls may control the frequency during the complete segment or clock cycle allotted thereto, it has been found desirable to maintain the frequency of the clock at about a 1KH$_z$ rate during each positive half cycle of the clock so that the duration of each low frequency portion is 0.5 milliseconds. Additionally, the range or duration of each segment which includes the 109 frequency portion should be from 1 to 2 milliseconds so that at the minimum of the range the high frequency exists for 0.5 milliseconds while at the maximum it exists for 1.5 milliseconds. The particular range has been found to be acceptable to known servo units to produce their full extent of adjustment. For controlling the duration of the positive part of the clock cycle there is provided a resistor 43 which is connected between the points 31 and 32 through a transistor 44. The transistor by the connections of its base and emitter to the output of gate 28 and inverter 29 is capable of only conducting when the clock 27 output is positive and is nonconducting when the clock output is low or negative. Accordingly, for the positive portion of all segments the resistor 43 is connected between the points 31 and 32 and even though it is connected simultaneously in parallel with the control resistors, its value is so low as to basically minimize the effect of its parallel connection with the control resistor and thus maintain an essentially constant duration for the low frequency portion for each segment. However, as the negative portion of each half cycle does not cause transistor 44 to conduct, the frequency or duration for the negative portion of each clock pulse is controlled entirely by the setting of the manual controls so that each cycle thus includes an essentially constant duration of low frequency and a variable portion of high frequency.

For the reset segment a bilateral switch 38 denoted 7 is caused to be conducting by the count terminals 7 and 8 being connected by a lead 45 to the gate thereof. The frequency of the negative portion is set by the value of a resistor 46 connected between the input and the lead 26. A loading resistor 47 is preferably connected to the lead 45.

Referring to FIG. 2, there is shown four plots having a common time base with the plot denoted "count" indicating the duration that each count of the counter has a positive voltage; the plot denoted "clock" represents the condition of the clock output either high or low voltage; the plot denoted "broadcast wave frequency" represents the frequency of the broadcast wave, either high or low and the plot marked "recovered pulses" indicating the duration of the recovered pulses in the remotely located device. As shown, for the counts 7 and the positive portion of the 8 count clock cycle, the broadcast frequency is low indicated by the horizontal line 48. For the negative portion of the clock for count 8, the broadcast frequency is high as indicated by the reference numeral 49. At the completion of the high portion 49, the clock begins its next cycle by shifting from low to high as indicated by the reference numeral 50, it immediately shifts the broadcast frequency from high to low and also advances the counter count to 1. This constitutes the termination of the reset segment and the beginning of the segment connected to the first control. For the duration of the high clock output when the counter has a count of 1, the broadcast frequency will be low, indicated by the reference numeral 51 while when the clock shifts from high to low and remains at low the broadcast frequency shifts to high and remains as indicated by the reference numeral 52. Basically the durations 51 and 52 are of 1 to 2 ratio (0.5 milliseconds to 1.0 milliseconds, respectively) when the tap 25 of the first control is at its midpoint of its movement, on the resistor 24.

Upon completion of the low cycle 52, the clock shifts to a high state for an essentially similar duration 51 and then shifts to low for a duration 53 which is quite small in view of the tap on the 2nd control 19 including very little, if any, resistance between the two points 31 and 32. Thus, the duration 52 is basically equal to duration 51 to produce a segment time of 1.0 milliseconds for the segment existing for the count of 2. During the third segment, the third control 20 is effective and has its tap positioned to insert the largest quantity of resistance between the points 31 and 32 to thus produce for the low state of the clock during the count of 3 of the counter, a duration 54 that is substantially larger than the duration 51 in view of there being more resistance inserted between the points 31 and 32. Upon completion of this duration the controls 21, 22 and 23 are essentially at the same setting as the first control 18 to thus produce the states, for the counts of 4, 5 and 6, respectively of the counter. Upon the count 7 being achieved, the reset pulse again appears to indicate that the repeatable sequence is to be repeated.

The representations of the recovered pulses are those that appear in a remotely controlled device as will be hereinafter disclosed. The reset pulse begins towards the end of the duration 48 and terminates with the beginning of the duration 49. Its duration is not essential as will become apparent, however, it must occur. The pulse marked first begins with the shift 50 and extends for the durations 51 and 52 which is the extent that the counter has a count of 1, which in turn is controlled by the setting of the 1st control 18. The pulse marked second begins immediately with the termination of the 1st pulse to extend for the durations 51 and 53 which again is directly related to the setting of the end control 19. The third pulse begins with termination of the second pulse which again coincides with the shift of the clock output from low to high, the shift of the frequency from high to low and continues for the duration of count 3 until the clock output again shifts from a low to a high state to index the count to 4 while the frequency shifts from high to low. Thus, the duration of each pulse is not only the extent of one cycle of the clock output which in turn is set by its respective control but also the pulses are continuous in time without any gap therebetween.

The recovered pulses occur in a remotely located device from decoding the broadcast wave by an FM receiver 60 (FIG. 3) which has an antenna 61, a tuned frequency circuit 62 that includes an RF amplifier and a first mixer, a second mixer and an IF amplifier 63, a filter 64 and an automatic gain control 65. The intermediate frequency from the filter 64 is applied to a phase lock loop detector 66 which produces on its output lead 67, a positive or high voltage whenever the broadcast frequency is higher than the carrier frequency and a low or ground voltage whenever the broadcast frequency is lower than the carrier frequency. The lead 67 is connected to a pulse amplifier and inverter 68 which inversely amplifies the voltage supplied thereto so that on a lead 68a, a low frequency produces a high voltage while a high frequency produces a low or ground voltage.

The pulses are utilized to control the individual position of the six servo units generally indicated by the reference numeral 69 and denoted first through sixth and which may be used to operate various mechanisms in a remotely controlled device. The pulses or voltage changes on the lead 68a are applied to the terminal C of a counter 70 that is identical to the counter 38. In addition, a reset pulse decoder 71 is connected to the lead 68a to receive the amplified pulses and is used to detect the duration 48 of the reset pulse, to produce a signal on a lead 72 to the reset terminal of the counter 70 which causes the counter to assume a 0 count. The counter has count terminals denoted 1 through 0 and the count 1 terminal is connected to a first pulse amplifier, the count 2 terminal is a second pulse amplifier, etc., with the count 6 terminal being connected to the sixth pulse amplifier, the amplifiers being generally indicated by the reference numeral 73.

When the broadcast wave is low for the reset segment the voltage level in the lead 68a will be high during the duration thereof and the reset pulse decoder 71 basically includes an RC circuit that will respond only to a selected duration of a high voltage input to apply a reset pulse over the lead 72 to the counter 70 reset terminal to cause it to assume a 0 count. As only the other portion 51 of each wave has the lead 68a high, the reset pulse is made to be about four times as long which enables the decoder 71 to be selected for a high voltage input of perhaps two to three times as long thus providing assurance of the reacting to the reset segment and the regulating of other occurrences when the lead 68a is high. The reset pulse disappears when duration 49 begins as the lead 68a then becomes low but this does not effect the counter maintaining its 0 count.

With the counter having a count of 0 by reason of the reset pulse, the shift 50 initiating the beginning of the duration 51 will cause the lead 68a to shift from low to high voltage which as it is applied to the counter terminal C, causes the counter to index one count to assume a count of 1. As the counter terminal C is only responsive to a change of voltage from low to high to effect indexing of its count the counter count of 1 will be maintained during the remainder of the portion 51 and also the portion 52 of the broadcast wave to produce the first recovered pulse. Upon the portion 51 next occurring, namely a shift from high to low frequency, the voltage on the lead 68a will shift from low to high which will cause the counter to again index one count and assume a count of 2 which is maintained not only for the duration 51 but also for the duration 53 as the change from a high to a low frequency which is a change from a high to low voltage on the lead 68a has no effect on the counter. This is represented by the second recovered pulse in FIG. 2. The counter will continue indexing for each high to low frequency change and the count terminal will be maintained not only for the duration of the low frequency segment but also for the high frequency segment to produce sequentially the remaining third, fourth, fifth and sixth pulse of the sequence.

The reset pulse again occurs which provides a pulse to the reset terminal to change the count of the counter to 0 and repeat the indexing of the counter for the remaining segments of the sequence so that at the same instant for the counts 1–6 both the counter 38 in the transmitter and the counter 70 in the remotely located device have the same count.

Count 1 terminal of the counter is connected to the 1st amplifier 73 which in turn is connected to the first servo 69. Similarly the other count terminals are connected through identically numbered amplifiers to identically numbered servo units. Each pulse amplifier accordingly receives a pulse for the time that its count terminal is high and amplifies this pulse for this duration to its respective servo so that a positive voltage is applied to each servo for the time that the counter 70 has the count associated with the servo. In the absence of an output from a pulse amplifier, no signal is applied to a servo.

Shown in FIG. 4 is a block and schematic diagram of the 1st servo with a lead 74 being connected thereto from the 1st pulse amplifier 73. The other servos are identical in construction and also have a similar input lead. The servo includes a one shot 75, having an input connected to the lead 74 by a capacitor 76 and an output connected to a common junction 77 to which the lead 74 is also connected. A pulse on the lead 74 thus appears at the common junction 77 as a positive voltage. Also the beginning of this pulse through the capacitor 76 actuates the one shot 75 to change its state with the duration of this state being controlled by the setting of a tap 78 on a resistor 79. The output of the one shot 75 to the common junction 77 is thus a negative pulse indicated by the reference numeral 80 which exists for the duration set by the position of the tap 78.

The pulses on the lead 74 and the pulse 80 are algebraically combined at the common terminal 77 which is connected to the bases of two transistors 81 and 82. These transistors are connected as shown to have their emitters joined together and connected to a motor 83 with the winding of the motor terminating at a common terminal of a D.C. power source. The plus side of the source is connected to the collector of the transistor 81 while the negative terminal is connected to the collector of the transistor 82. Moreover, the motor as shown by the dotted line 84 is mechanically connected to the tap 78.

With this structure if the pulse on lead 74 equals in duration the pulse 80, then there is no voltage at the common junction 77 and neither transistor 81 or 82 will conduct. The motor will not receive any energy, so it will not move and thus it will maintain its present position. If the pulse on lead 74 lengthens as by its control being shifted to include more resistance between the points 31 and 32, the difference between it and the pulse 80 will be applied as a voltage to the bases of the transistors but only transistor 81 will conduct to supply to the motor 83 energy during this difference period. The motor will then move to assume a new position and simultaneously move the tap 78 rightwardly to place more resistance in the R-C circuit of the one shot 75 and lengthen its pulse 80 so that when the next pulse on lead 74 occurs, the pulse 80 will have lengthened and a lesser differential, if any, will exist between these durations. If there is a difference, it will cause the motor 83 to again be energized until it has moved the tap 78 to cause the one shot pulse to be identical in duration to the pulse received from the pulse amplifier 73. The number of pulses each servo receives is on the order of over 100 per second so that it is capable of rapid response even though operating only on the difference between pulses. Thus the motor 83 will attempt to assume and will assume a position dictated by the duration of the recovered pulse directed to its servo unit. The motor is normally connected to an operating part of a remote control device and its movement also moves the part.

While the above-described system discloses a system for transmitting information for controlling six servos by six controls if desired, it may also be utilized to control a lesser number of controls. In such an instant any control eliminated, as for example, the control 23, it would be required to have a resistor such as a resistor 46 connected between the lead 26 and the input of the associated bilateral switch to provide a resistance in the clock. No change would have to be made in the receiver as there would simply be no servo connected to its respective pulse amplifier. Naturally to increase the number of channels, only an increase in the capacity of the counter's count plus another control and bilateral switch are required for each additional channel.

To assure that there is some resistance in the clock between the points 31 and 32 when a control is connected to the clock, it is presently preferred to limit the movement of the tap, such as the tap 25 on the resistance 24 leftwardly so that there still remains at the maximum leftward position of the tap 25 a portion of the resistance 24 between points 31 and 32. It will be clear, however, that if desired a fixed resistance could be inserted between the point 32 and the output of the bilateral switches instead so that the tap 25 may have a full movement on the resistor 24.

It has been found desirable to utilize many available integrated circuits in the system of the present invention with, for example, the counters 38 and 72 being type CD 4022, the bilateral switches 34 being type CD 4016, the clock 27 being type CD 4001 and the phase lock loop detector 66 being type CD4046 presently available from the RCA Corporation.

Referring to FIG. 5 there is shown a schematic diagram of the plural frequency oscillator 11 which enables the selection of any one of a plurality of different carrier frequencies. Each receiver by means of a crystal 26a (FIG. 3) can only receive one carrier frequency and the transmitter of the present invention may be used with any one of a plurality of different remote control devices each of which responds to a different carrier frequency or if interference is found on one carrier frequency with a device, changing the plural frequency oscillator and the crystal 26a to a different carrier frequency would eliminate the interference. The plural frequency oscillator herein disclosed may transmit on one of five different carrier frequencies. A crystal is required for each carrier frequency with the crystals being indicated as first, second, third, fourth and fifth and the group of crystals by the reference numeral 85. Each of the crystals has one side connected to a terminal of the five position switch 12 that has a movable contact 12a which is connected to the junction 86 of a resistor 87, capacitor 88 and diode 89. Resistor 87 is also connected through a resistance 90 to the lead 14 while a capacitor 91 connects at the junction of resistors 90 and 87 to ground.

The other sides of the crystals are parallelly connected to a base 92 of a transistor 93. Also connected to the base are resistors 94 and 95 with the former being connected to a plus DC source and the latter to ground and a capacitor 96. The collector of the transmitter is connected to an LC circuit 97 which has an output 98 that is connected to the input of the RF amplifier of block 15.

In the operation of the plural frequency oscillator irrespective of which carrier frequency is selected, when a low or ground voltage is applied on the lead 14, the transistor 93 oscillates at a rate determined by the crystal connected to the tap 12a plus a slight additional frequency by reason of a circuit through the resistance 94, the selected crystal and the capacitor 88. When the voltage on the lead 14 is positive, the diode 89 is caused to conduct which effectively removes the capacitor 88 from the circuit as the diode presents essentially a short circuit path to ground and causes the frequency of conduction of transistor 93 to be at a rate set by the fist crystal less the frequency set by the capacitor 96. The increase and decrease in frequency is essentially the same for each of the carrier frequencies with the amount of decrease being essentially set by the value of the capacitor 96 and the amount of the frequency increase being set by the value of capacitor 88. The oscillations of the transistor 93 are transferred by the LC circuit 97 to the amplifier and frequency multiplier 15 on the lead 98.

As the frequency multiplier 15 multiplies the frequency received on lead 98 to that desired for the carrier frequency, the crystals are selected to have an oscillatory frequency which is the fraction by which the multiplier multiplies the frequency. Thus, for a normal carrier frequency of 26.995 MH$_z$ and the multiplier 15 doubling its received signal, a crystal having a normal oscillatory frequency of 13.4975 MH$_z$ would be used and the change therein caused by the voltage at the modulating input 14 would be one-half that which occurs in the frequency of a broadcasted wave.

In this embodiment of five carrier frequencies, it has been found that the frequencies of the crystals could be selected so that they vary by 25 KH$_z$ in order to produce carrier frequencies which differ by 50 KH$_z$. However, as the broadcast wave frequency is only modulated ±5KH$_z$ from the carrier frequency there is a substantial portion of each carrier frequency that is unused. This would enable, if desired, increasing the number of carrier frequencies to more than five without extending the wave band in which the receiver may transmit.

It will accordingly be appreciated that there has been disclosed a remote control system for controlling by a frequency modulated radio wave the adjustment of servo units in accordance with positions of controls. The wave is only modulated to be at one or the other of two different frequencies and though continuously broadcasted without amplitude modulation it consists of repeatable sequences with each sequence being a plurality of segments. Each segment includes a portion of one frequency and a portion of another frequency and the segment's duration is regulated by the position of a control. Thus the system is precise and accurate in effecting correspondence between the adjustment of a servo and its control, is capable of maintaining this preciseness even for a wide range of battery or source voltage, has a long range by reason of it utilizing only two frequencies, substantially minimizes the effect of spurious signals or noise either by radio waves or with the remote controlled device and produces a minimum of interference wuth adjacent carrier frequencies.

Variations and modifications may be made within the scope of the claims and portions of the improvements may be used without others.

We claim:

1. A remote control radio system comprising a plurality of adjustable controls with each control supplying a signal related to its adjustment, a radio transmitter for transmitting a radio wave at a carrier frequency, means for subdividing the radio wave into a continuously repeatable sequence with each sequence having a plurality of segments, there being one segment associated with each control, means for causing each segment of the wave to have a portion of the segment on one frequency and the remaining portion of the segment on another frequency with both frequencies being near the carrier frequency and means for relating the duration of each segment to the signal supplied by its associated control; and a device located remotely from the transmitter and having a plurality of servo units with there being one servo unit for each control, each of said servo units having means for producing a response that is related to the duration of an electrical pulse supplied thereto, a receiver in the device having an antenna for receiving the transmitted wave and demodulating each segment of the wave into an electrical pulse having a duration related to the duration of the segment and means for directing the pulse from the same segment in each sequence to the same servo unit to cause said servo units to respond to the duration of the pulse directed thereto.

2. The invention as defined in claim 1 in which the means for causing the two portions of different frequencies includes a frequency modulating means responsive to the value of a voltage applied thereto to vary the frequency and in which there are means for providing a voltage shiftable between two values to said frequency modulating means.

3. The invention as defined in claim 2 in which the shiftable voltage supplying means includes a clock for producing a cycle for each segment consisting of a part having a voltage of one value and a remaining part having another value and means for varying the duration of each cycle including connections to the manual controls.

4. The invention as defined in claim 1 in which the means for relating includes means for permitting the signal from only one control to be effective to control the duration of a segment and means for sequentially permitting the signals from the controls to be effective.

5. The invention as defined in claim 4 in which the permitting means includes a counter having a plurality of count terminals at which an indication of the count of the counter appears, a plurality of switch means with there being one switch means connected to each control and means connecting one count terminal to one switch to cause the switch means to be operative to permit its control to vary the duration of a segment only when the counter has the indicated count associated with each switch means.

6. The invention as defined in claim 5 in which there are means for shifting the counter one count with the appearance of each segment.

7. The invention as defined in claim 1 in which there are means for maintaining substantially constant the duration of the one portion of each segment, in which the duration of the other portion is regulated by the means for relating and in which the duration of the demodulated electrical pulse equals the duration of the segment producing same.

8. The invention as defined in claim 1 in which the means for causing includes a variable frequency clock having an output at one or another voltage level and means for adjusting the duration of one of the voltage levels.

* * * * *